US012762524B2

(12) United States Patent
Vosseller et al.

(10) Patent No.: US 12,762,524 B2
(45) **Date of Patent: *Oct. 13, 2026**

(54) SUPPLEMENTAL DIGITAL CONTENT ACCESS CONTROL USING NONFUNGIBLE TOKENS (NFTS)

(71) Applicant: eBay Inc., San Jose, CA (US)

(72) Inventors: Shannon Bruce Vosseller, San Francisco, CA (US); Christopher Michael Matthews, Pacifica, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/354,593

(22) Filed: Oct. 9, 2025

(65) Prior Publication Data

US 2026/0039493 A1 Feb. 5, 2026

Related U.S. Application Data

(63) Continuation of application No. 17/411,852, filed on Aug. 25, 2021, now Pat. No. 12,463,836.

(51) Int. Cl.

| | |
|---|---|
| ***G06Q 20/12*** | (2012.01) |
| ***G06Q 20/38*** | (2012.01) |
| ***G06Q 20/40*** | (2012.01) |
| ***G06Q 30/018*** | (2023.01) |
| ***H04L 9/00*** | (2022.01) |
| ***H04L 9/32*** | (2006.01) |
| *G06Q 30/016* | (2023.01) |

(52) U.S. Cl.

CPC ..... *G06Q 20/123* (2013.01); *G06Q 20/38215* (2013.01); *G06Q 20/401* (2013.01); *G06Q 30/018* (2013.01); *H04L 9/3213* (2013.01); *H04L 9/50* (2022.05); *G06Q 30/016* (2013.01); *G06Q 2220/00* (2013.01); *H04L 2209/56* (2013.01)

(58) Field of Classification Search

CPC ............. G06Q 20/0655; G06Q 20/123; G06Q 20/38215; G06Q 20/401; G06Q 30/016; G06Q 30/018; G06Q 2220/00; H04L 9/3213; H04L 9/50; H04L 2209/56

USPC ............................................................ 705/65

See application file for complete search history.

(56) References Cited

U.S. PATENT DOCUMENTS

| | | | | |
|---|---|---|---|---|
| 2005/0033655 | A1* | 2/2005 | Woolston | G06Q 30/0623 705/26.81 |
| 2020/0005284 | A1* | 1/2020 | Vijayan | G06Q 20/065 |
| 2020/0027145 | A1* | 1/2020 | Tuli | G06Q 30/0609 |
| 2020/0074461 | A1* | 3/2020 | DeRosa-Grund | G06F 21/32 |
| 2020/0110728 | A1* | 4/2020 | Semenov | G06F 16/183 |
| 2020/0242105 | A1* | 7/2020 | Rich | G06F 16/2379 |
| 2021/0035246 | A1* | 2/2021 | Schouppe | H04L 9/50 |
| 2022/0358578 | A1* | 11/2022 | Sliwka | G06Q 40/03 |
| 2023/0009908 | A1* | 1/2023 | Castinado | H04L 9/0819 |

(Continued)

*Primary Examiner* — Wodajo Getachew

(74) *Attorney, Agent, or Firm* — FIG. 1 Patents

(57) ABSTRACT

Techniques are described, as implemented by computing devices, to control access to digital content through use of nonfungible tokens (NFTs). This is performed by leveraging a blockchain such that digital content associated with an item is made available to supplement use of the item (e.g., to supplement use of a physical item, digital content, and so forth) or make other functionality available based on a user's possession of the item.

20 Claims, 11 Drawing Sheets

(56) References Cited

U.S. PATENT DOCUMENTS

| | | | | |
|---|---|---|---|---|
| 2023/0126386 | A1* | 4/2023 | Kurian ............. | G06Q 20/38215<br>705/76 |
| 2026/0017643 | A1 | 1/2026 | Vosseller et al. | |

* cited by examiner

SUPPLEMENTAL DIGITAL CONTENT ACCESS CONTROL USING NONFUNGIBLE TOKENS (NFTS)

RELATED APPLICATION

This application is a continuation of, and claims priority to, U.S. patent application Ser. No. 17/411,852, filed Aug. 25, 2021, and titled "Supplemental Digital Content Access Control using Nonfungible Tokens (NFTs)," the disclosure of which is hereby incorporated by reference in its entirety.

BACKGROUND

Digital content has become the primary mechanism by which information is maintained, organized, and shared between users. Because of this, the types and variety of digital content exposed to even casual users in a typical day is ever increasing. For example, digital content may be configured as an item that is of primary interest to the user, itself, such as a digital image, digital movie, and so forth. Supplemental digital content is also configurable in support of these items of primary interest, examples of which include owner's manuals, digital receipts, bills of sale, product keys, and shipping information.

Consequently, even a single item of digital content that is of primary interest to a user may have an additional plurality of items of supplemental digital content associated with it that are configured to support use of that single item. As a result, users are tasked with maintaining and organizing a multitude of digital content, which may become lost over time as users change between computing devices, network accounts, and so on. Accordingly, functionality made available by that supplemental digital content is also lost.

SUMMARY

Techniques are described, as implemented by computing devices, to control access to digital content through use of nonfungible tokens (NFTs). This is performed by leveraging a blockchain such that digital content associated with an item is made available to supplement use of the item (e.g., to supplement use of a physical item, digital content, and so forth) or make other functionality available based on a user's possession of the item.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
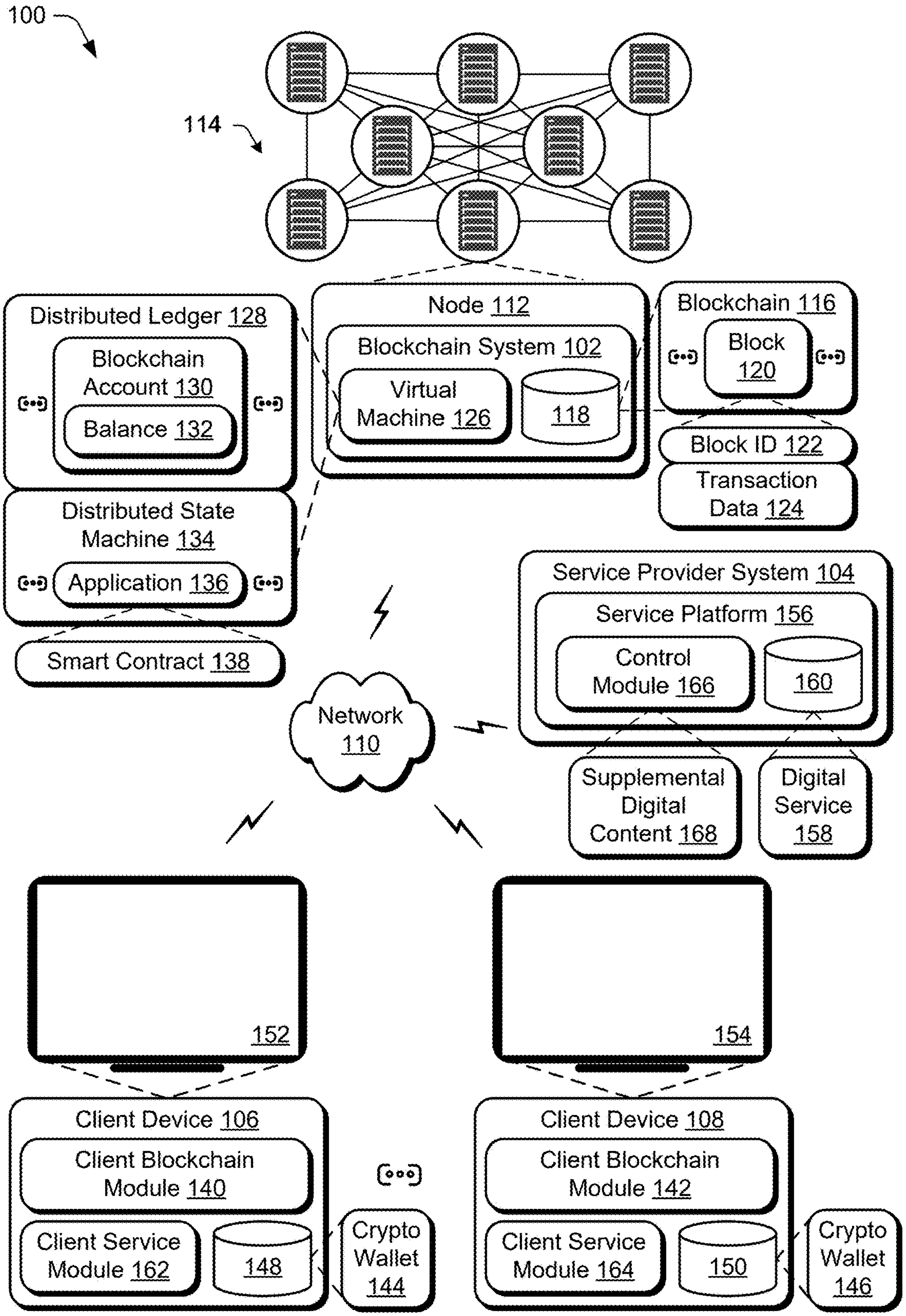
FIG. 1 is an illustration of an environment in an example implementation that is operable to employ supplemental digital content access control techniques using NFTs as described herein.

Techniques are described, as implemented by computing devices, to control access to digital content through use of nonfungible tokens (NFTs). This is performed by leveraging a blockchain such that digital content associated with an item is made available to supplement use of the item (e.g., to supplement use of a physical item, digital content, and so forth) or make other functionality available based on a user's possession of the item.

In one example, a transaction involving an item is implemented by a service provider system. The item is configurable as a physical item (e.g., a physical object such as a wristwatch, item of clothing, product component) or as digital content, e.g., a digital image, digital audio, digital media, digital artwork, and so forth. Data is generated by the service provider system that describes the item, itself. In an instance in which the item is a physical item, the data describes physical characteristics of the physical item, e.g., by scanning the item in two or three dimensions using a physical scanner to generate a "fingerprint" of the item. In instances in which the item is digital content, the data is generated from data forming the content itself, e.g., is the data forming the digital content, as a hash of the data of the digital content, etc.

This data is then used by the service provider system to initiate minting of a nonfungible token (NFT) to a blockchain by a blockchain system. The data generated above, for instance, is "signed" by a private key associated with a blockchain account to confirm authenticity of the data, such as for a recipient of the item involved in the transaction. Other operations may also be involved as part of minting the NFT, e.g., to approve "gas." The data is then minted by nodes of a blockchain system and as such is incorporated within a block of the blockchain. At this point, the NFT is recorded in an irreversible and tamper-proof manner as describing characteristics of the item and the transaction involving the item.

The service provider system is also configured to generate an application to control access to supplemental digital content associated with the item based on possession of the NFT. The NFT in this example corresponds to an item (e.g., a physical item or digital content) and describes that item. Thus, the NFT functions as a "twin" of the item, possession of which is trackable using a blockchain. To leverage this "twinning," the application is configured to control access to supplemental digital content based on possession of the NFT as verifiable via the blockchain.

The application, for instance, is generated to control access to the supplemental digital content (e.g., as made available by the service provider system) once possession of the NFT is verified. In one example, the application is executable as part of a distributed state machine implemented by the blockchain system. The application is a collection of code and other data that is deployed using cryptographically signed transactions by nodes of the blockchain system that implements the distributed state machine. The application, once deployed, is configured to automate execution of conditions of the application as part of the blockchain.

In this instance, the application is configured to provide access to the supplemental digital content that is made available by the service provider system. Further, this access is based on possession of the NFT. Continuing the example above, the NFT is minted based on occurrence of a transaction involving the item by a service platform of the service provider system. The supplemental digital content provides an ability of the service provider system to communicate further with an entity that possesses the NFT using an application that is executed by the distributed state machine "outside" of the service provider system.

The supplemental digital content, for instance, may include an offer redeemable by the service provider system, e.g., a discount for a subsequent transaction involving that item or a different item via the service platform thereby reducing a transaction cost. This digital content is made available by the service provider system to the application as executed by the distributed state machine, e.g., via network address, application programming interface (API), and so on. Verification of the NFT is used by the application to control access to the supplemental digital content apart and distinct from the service provider system.

Subsequent utilization of the supplemental digital content, itself, may be performed through execution of the application by the distributed state machine and/or by the service provider system. In a first example, the digital content is accessed and utilized through application execution using the distributed state machine. In a second example, the application permits access to the supplemental digital content, which is then redeemable at the service provider system through execution at the service provider system. A variety of types of supplemental digital content may be made available via these techniques, such as offers involving subsequent transaction at the service provider system, updates regarding the item for which the NFT is a twin, verification of authenticity of the item, and so on. Further discussion of these and other examples is included in the following sections and shown in corresponding figures.

In the following discussion, an example blockchain environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a blockchain environment 100 in an example implementation that is operable to employ techniques described herein. The blockchain environment 100 includes a blockchain system 102, a service provider system 104, and a plurality of client devices (represented as client devices 106, . . . , 108) that are communicatively coupled, one to another, via a network 110.

Computing devices that implement the blockchain environment 100 are configurable in a variety of ways. A computing device, for instance, is configurable as a desktop computer, a laptop computer, a mobile device (e.g., assuming a handheld configuration such as a tablet or mobile phone), IoT device, a wearable device, AR/VR device, a server, and so forth. Thus, a computing device ranges from full resource devices with substantial memory and processor resources to low-resource devices with limited memory and/or processing resources. Additionally, although in instances in the following discussion reference is made to a computing device in the singular, a computing device is also representative of a plurality of different devices, such as multiple servers of a server farm utilized to perform operations "over the cloud" as further described in relation to FIG. 11.

The blockchain system 102 is implemented by a plurality of nodes 112. Nodes 112 are a runtime implemented using processing, memory, and network resources of respective computing devices 114 that operate as the infrastructure of the blockchain 116. As part of this, the nodes 112 store, communicate, process, and manage data that makes up the blockchain 116. Nodes 112 are interconnected as illustrated in FIG. 1 to exchange data via the network 110, e.g., as a peer-to-peer network in a distributed and decentralized manner.

The blockchain 116 is formed using a plurality of blocks 120, illustrated in FIG. 1 as including respective block identifiers (IDs) 122 and transaction data 124. Transaction data 124 of the blocks 120 includes batches of validated transactions that are hashed and encoded. Each block 120 includes a cryptographic hash of a prior block 120 in the blockchain 116, thereby linking the blocks 120 to each other to form the blockchain 116. As a result, the blocks 120 cannot be altered retroactively without altering each subsequent block 120 in the blockchain 116 and in this way protects against attacks by malicious parties.

In order to generate the blocks 120 for addition to the blockchain 116, a node 112 is implemented as a "miner" to add a block of transactions to the blockchain 116. The other nodes 112 of the blockchain system 102 then check if the block of transactions is valid, and based on this, determine whether to accept or reject this data. If valid, the block of transactions is stored as transaction data 124 along with a block ID 122 for a respective block 120, e.g., is stored "at the end" or "at the top" of the blockchain 116 along with a hash of a previous block in the chain. The nodes 112 then broadcast this transaction history via the network 110 for sharing with other nodes 112. This acts to synchronize the blocks 120 of the blockchain 116 across the distributed architecture of the blockchain system 102. Other types of nodes 112 are also included as part of the blockchain system 102. In one such example, full nodes are nodes that store an entirety of the blockchain 116, e.g., locally in computer-readable storage media of a respective storage device 118. Other types of nodes are also employed to implement additional functionality to govern voting events, execution of protocol operations, rules enforcement, and so forth.

The blockchain system 102 implements a virtual machine 126 that is representative of a diverse range of functionality made possible by leveraging the blockchain 116. In a first such example, the virtual machine 126 implements a distributed ledger 128 of accounts 130 and associated balances 132 of those accounts 130. Distributed ledgers 128 support secure transfer of digital assets (e.g., tokens or coins of cryptocurrencies) between accounts 130 without management by a central authority through storage as part of the transaction data 124 of the blockchain 116. Through synchronized and distributed access supported by the blockchain 116 as described above, changes to balances 132 (e.g., a number of tokens) are visible to any entity with access to the blockchain 116. Techniques are also implemented to support management of the balances 132 across the accounts 130, e.g., to enforce rules that a respective account 130 does not transfer more coins than are available based on a balance 132 specified for that account 130.

In another example, the virtual machine 126 implements a distributed state machine 134 that supports application 136 execution. The distributed state machine 134 is implemented along with the transaction data 124 within the blocks 120 of the blockchain 116 such that the blocks describe accounts and balances as described above for the distributed ledger 128. The transaction data 124 also supports a machine state, which can change from block to block of the blockchain 116. In one example, the application 136 is executable as part of a "Turing-complete" decentralized virtual machine that is distributed across the nodes 112 of the blockchain system 102. As Turning-complete, the application 136 is computationally universal to perform computing device operations, e.g., logic or computing functions. Thus, the application 136 is executable by a processing system of a computing device as software that is storable in a computer-readable storage media of the nodes 112 to perform a variety of operations.

An example of an application 136 that is executable as part of the distributed state machine 134 is a smart contract 138. A smart contract 138 is executable automatically and without user intervention (or with partial human interaction as inputs when desired) by the nodes 112 of the distributed state machine 134. Execution of the smart contract 138 includes obtaining data from a specified data source (e.g., devices, APIs, and so forth that are accessible via the network 110), and based on this data, initiating one or more operations based on conditions described in the smart contract 138. In one example, the smart contract 138 is a type of account 130 that includes a balance 132 and initiates transactions based on conditions specified by the smart contract 138, e.g., to support automated escrow and other functionalities. A variety of other examples are also contemplated that support implementation of any executable operation by a computing device using software.

Cryptocurrencies (e.g., coins of the cryptocurrency) are the native asset of the blockchain 116, and tokens are created "on top" of these blockchains. In an example of a token, the smart contracts 138 implement non-fungible tokens (NFTs). NFTs include digital assets that are provably unique and as such cannot be duplicated or divided. As such, NFTs are not exchanged as having a same value as coins in cryptocurrency, but rather are digital assets having identifying information recorded as part of the smart contract 138. This identifying information is immutably recorded on that token's blockchain 116 and thus ownership of the token is also recorded and tracked. A variety of information is storable as part of the digital content represented by the NFT, examples of which include digital images, digital media, digital content, executable instructions of an application 136 as described above, secure file links, in-game tokens, digital artwork, and so forth. Other examples of tokens are also contemplated that are fungible and as such are interchangeable with each other.

The client devices 106, 108 include respective client blockchain modules 140, 142 that are representative of functionality of the client devices 106, 108 to interact with the blockchain system 102. An example of this functionality includes management of respective crypto wallets 144, 146, e.g., in local storage devices 148, 150. The crypto wallets 144, 146 store public and private cryptographic keys in this example that are used to support interaction with the blockchain system 102, and more particularly respective accounts 130 of the blockchain system 102, using respective user interfaces 152, 154.

The public key supports transactions to an address of the account 130 derived from the public key, which are stored as part of the blockchain 116 to memorialize the transaction as part of transaction data 124. In one example, an address of an account 130 is generated by first generating a private key, e.g., using a randomization technique. The corresponding public key is derived from the private key and the address of the account 130 is then derived from the public key, e.g., as an entirety of the public key or as a shortened version of the public key. The private key is used to "unlock" transactions that are "locked" by the public key and gain access to the account 130, e.g., access to coins, tokens or other information maintained as part of the transaction.

In one example, a transaction is initiated by the client device 106 with client device 108. Data of the transaction is encrypted using a public key. The transaction is then signed by client device 108 using the private key which indicates that the transaction has not been modified, e.g., by encrypting the data being sent in the transaction using the private key. The transaction is then verifiable as authentic by using the public key included with the data. The nodes 112 use the accompanying public key to automatically verify authenticity that the transaction is signed using the private key. Transactions that fail authentication are rejected by the nodes 112. Authentic transactions are used as part of transaction data 124 in minting blocks 120 by the nodes 112 that are added to the blockchain 116, e.g., as part of the distributed ledger 128. In this way, the virtual machine 126 of the blockchain system 102 supports a variety of functionality through use of the distributed ledger 128, distributed state machine 134, and/or other blockchain and cryptographic functionality.

The blockchain environment 100 also includes a service provider system 104 implementing a service platform 156 of digital services 158, illustrated as maintained in a storage device 160 and are executable via a processing system. Digital services 158 involve electronic delivery of data and implementation of data functionality by computing devices to support a range of computing device operations. Digital services 158, for instance, include creation, management, and dissemination of digital content via the network 110, e.g., webpages, applications, digital images, digital audio, digital video, and so forth. The digital services 158 are also implemented to control access to and transfer of physical goods and services through corresponding digital content, e.g., sales, product listings, advertisements, etc. Digital services 158 further pertain to operation of computational resources (e.g., processing, memory, and network resources) of computing devices that support the access to and management of the digital content by the system.

Functionality of the client devices 106, 108 to access the digital services 158 of the service provider system 104 is represented by respective client service modules 162, 164. The client service modules 162, 164, are configurable as browser, network-enabled applications, third-party plugins, and so on to access the digital services 158 via the network 110.

The service provider system 104 also includes a control module 166. The control module 166 is configured to control output of supplemental digital content 168 through use of an application 136 generated by the service provider system 104 and executed by the distributed state machine 134. The service platform 156, for instance, includes a digital service 158 configured to support transactions of items, e.g., physical items or digital content, using service provider accounts. Minting of an NFT is initiated by the service platform 156, responsive to this transaction, that describes characteristics of the item that is a subject of the transaction. The service platform 156, for instance, generates data that describes the item and provides this data to the blockchain system 102 for minting as an NFT as part of the blockchain 116, ownership of which is associated with a blockchain account 130 of a recipient of the item.

The service platform 156 is also configured to generate and initiate minting of the application 136 for execution as part of the distributed state machine 134 of the blockchain 116. The application 136 is configured to provide access by the client device 108 to the supplemental digital content 168 based on possession of the NFT. In this way, execution of the application 136 and use of the supplemental digital content 168 provides an ability of the service provider system to communicate further with the client device 108.

In the "twinning" example above, the NFT corresponds to an item (e.g., a physical item or digital content) and describes that item. Thus, the NFT functions to verify the item that is the subject to the transaction and as such increases value of the item through publicly verifiable ownership of the NFT. To leverage this "twinning," the supplemental digital content 168 is configurable to encourage retention of the NFT by an entity that owns the item. An example of this is configuring the supplemental digital content 168 to include an offer. The offer is redeemable by the service provider system 104 to encourage future interaction with the service provider system 104, such as through a reduction in a transaction fee for a subsequent sale of the item or a different item via the service platform 156. In this way, the supplemental digital content 168 encourages an entity that possess the item to also maintain possession of the NFT and thus retain an ability to verify authenticity of the item associated using the NFT. Further discussion of these and other examples is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Supplemental Digital Content Access Control

Figure 2:
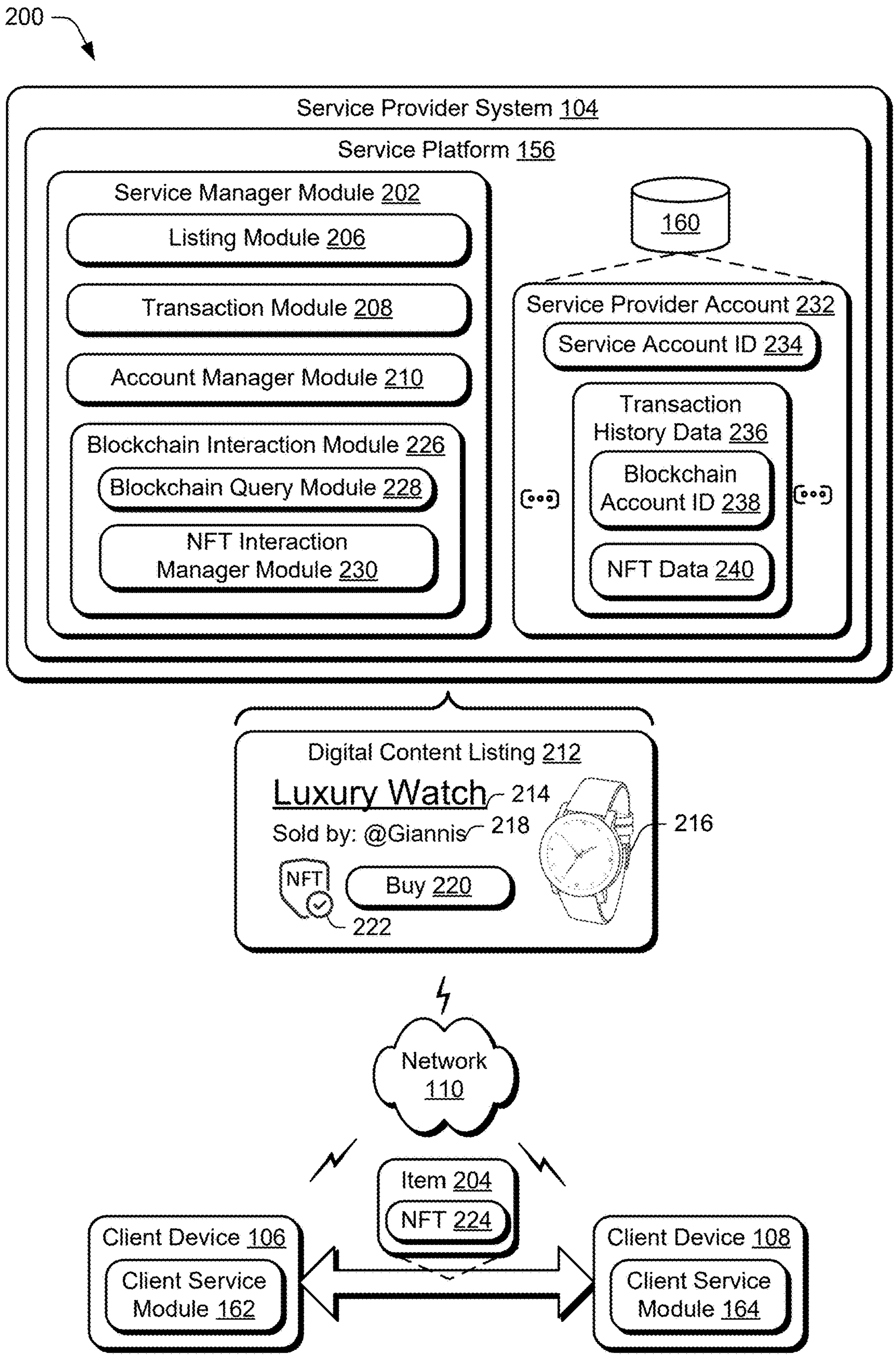
FIG. 2 depicts a system in an example implementation showing operation of a service platform of a service provider system of FIG. 1 in greater detail as implementing a transaction between client devices.
Figure 3:
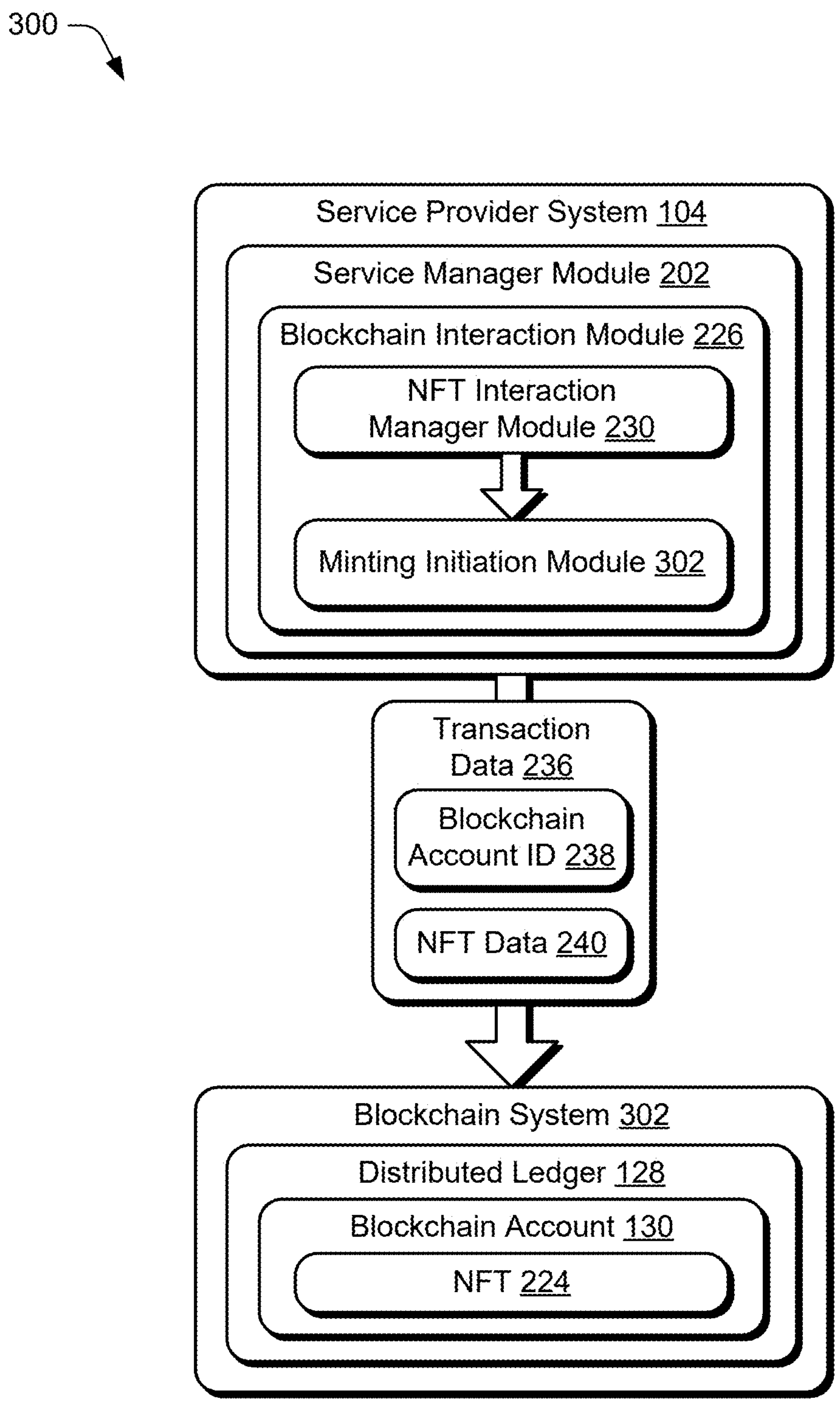
FIG. 3 depicts a system in an example implementation of initiating minting by the service provider system of a NFT responsive to the transaction of FIG. 2.
Figure 4:
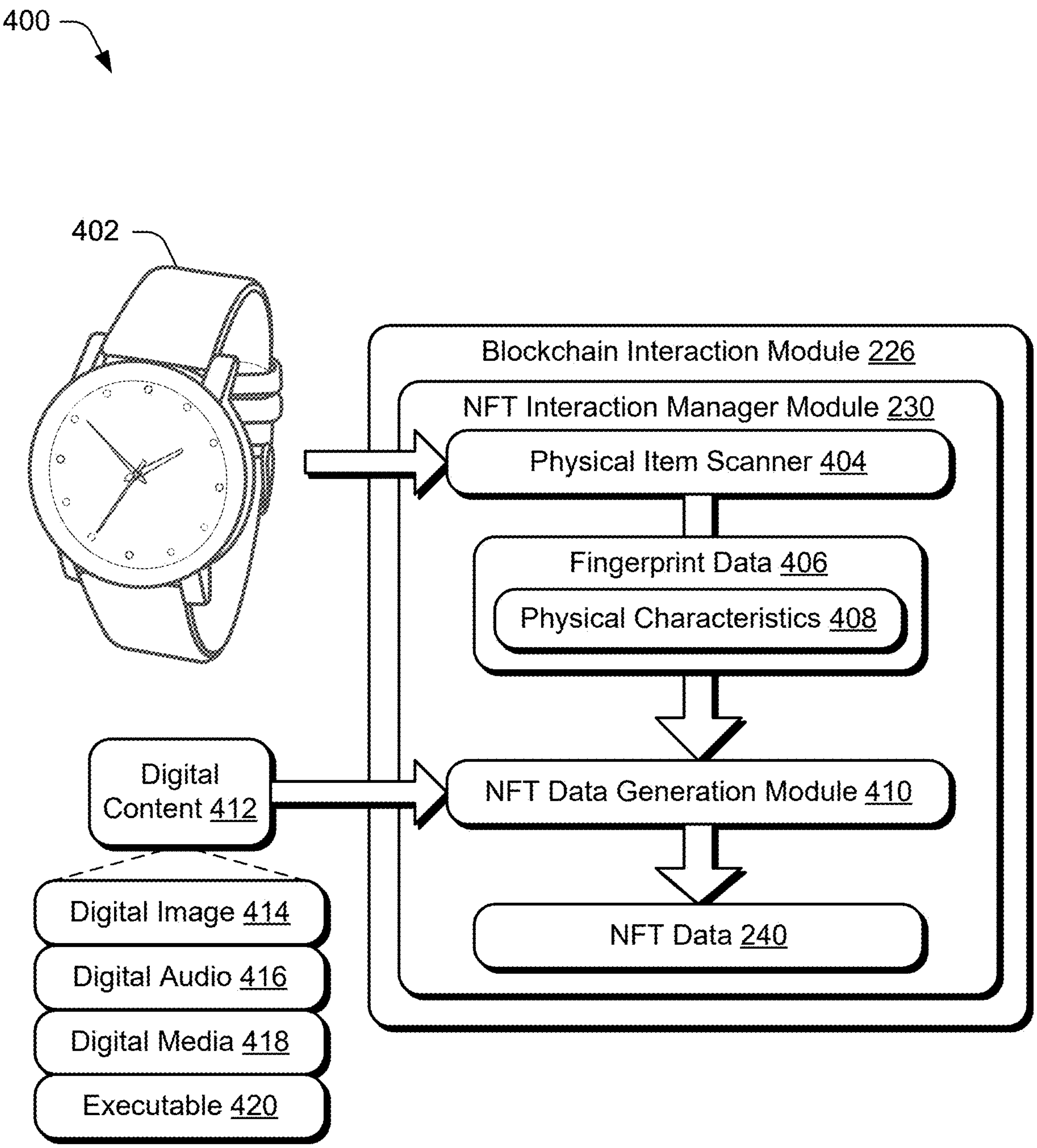
FIG. 4 depicts a system in an example implementation showing generation of NFT data used to mint the NFT of FIG. 3.
Figure 5:
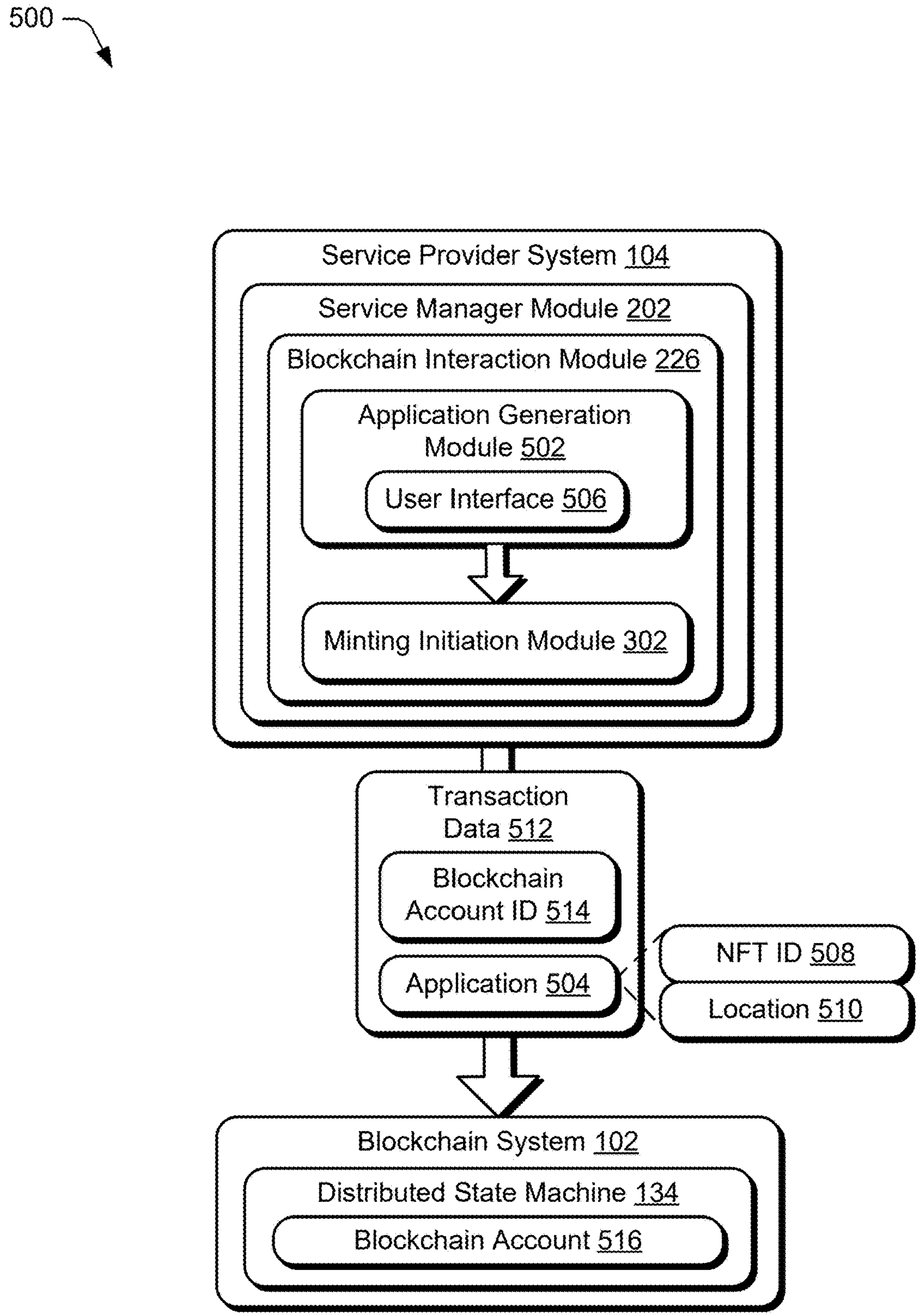
FIG. 5 depicts a system in an example implementation of initiating minting of an application by the service provider system responsive to the transaction of FIG. 2.
Figure 6:
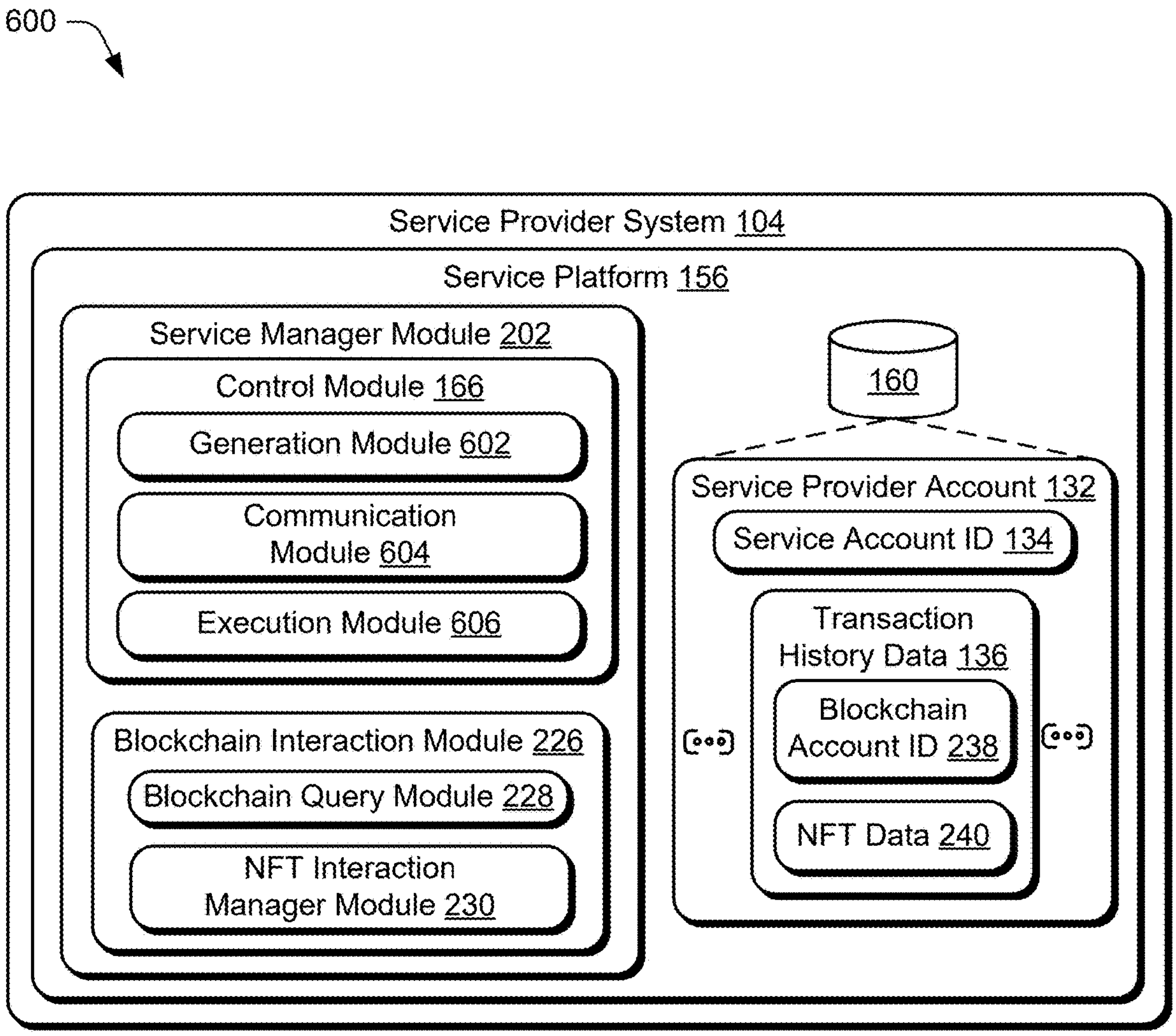
FIG. 6 depicts a system in an example implementation showing generation of the application of FIG. 5 in greater detail.
Figure 7:
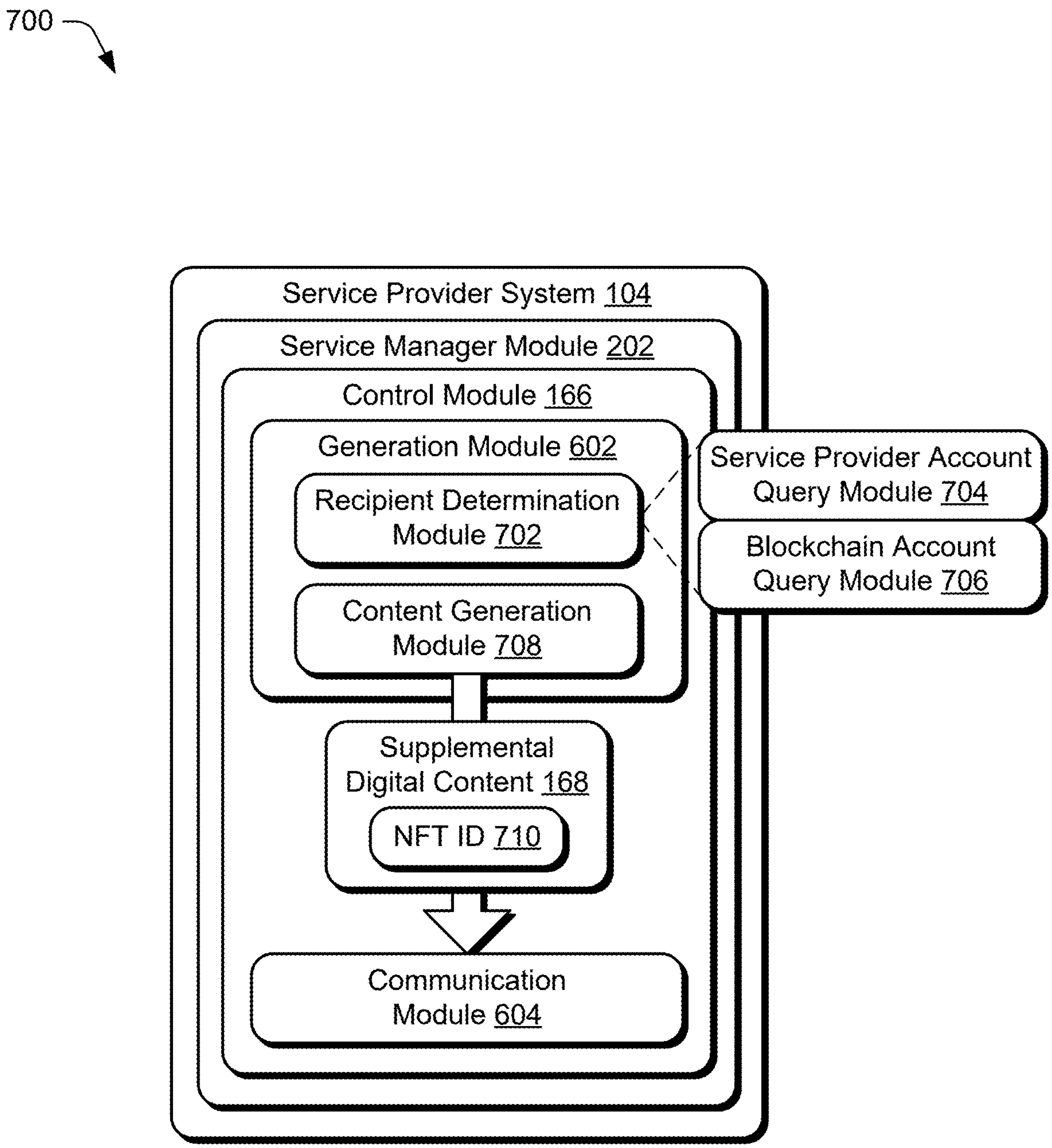
FIG. 7 depicts a system in an example implementation of supplemental content generation.
Figure 8:
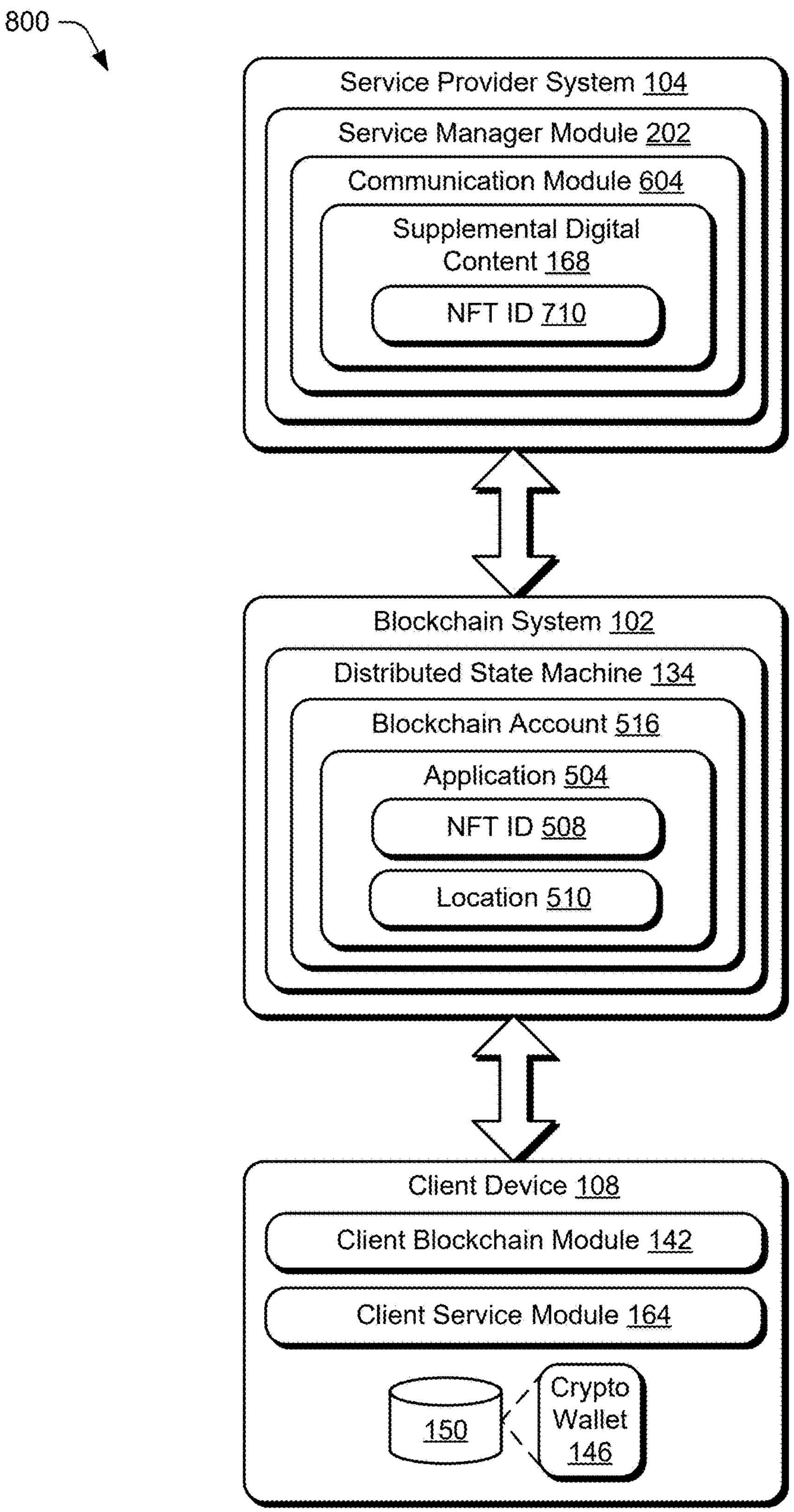
FIG. 8 depicts a system in an example implementation in which execution of the application by a distributed state machine of a blockchain system is used to control access to supplemental digital content based on possession of the NFT.
Figure 9:
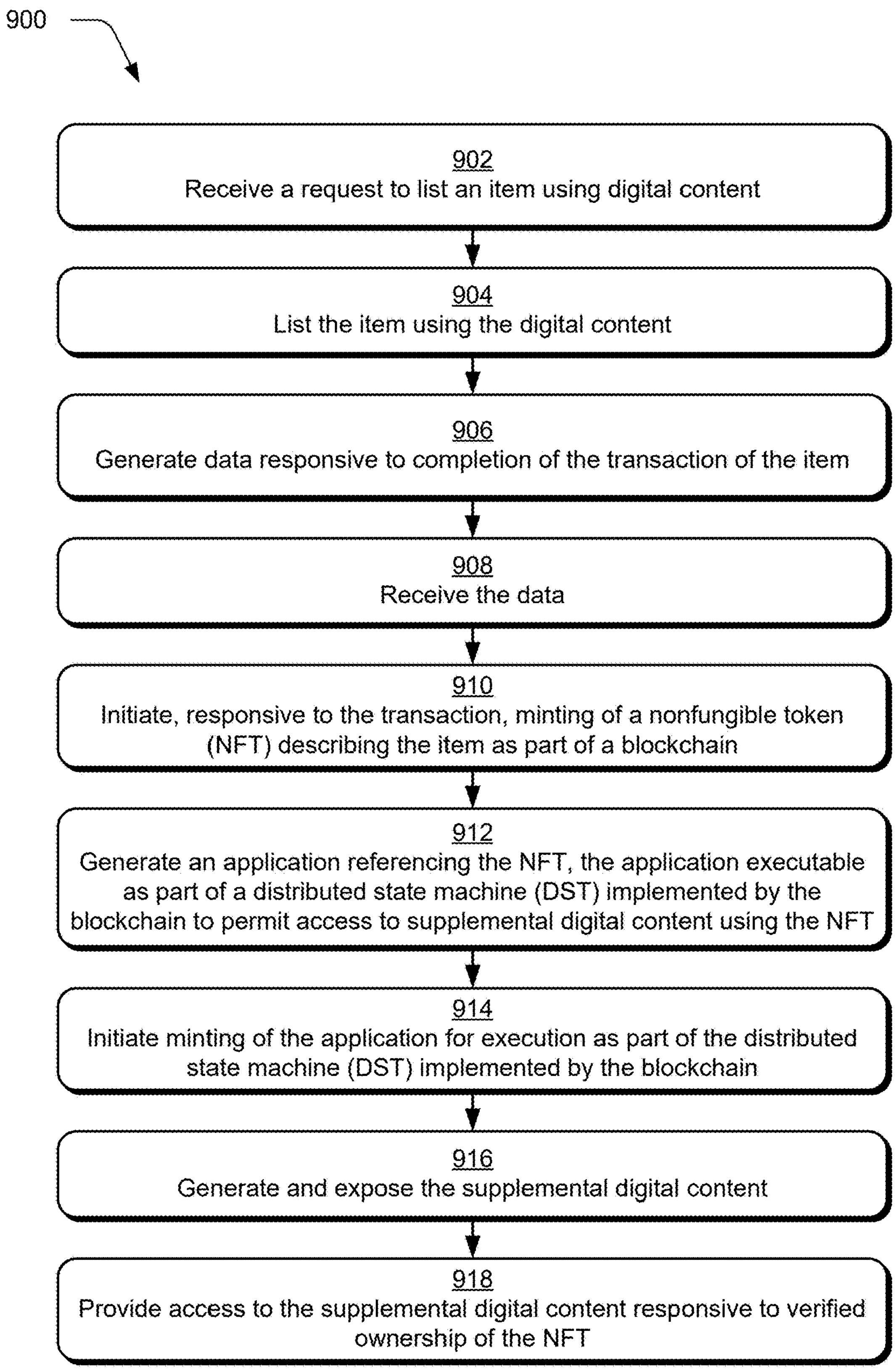
FIG. 9 is a flow diagram depicting a procedure in an example implementation of supplemental digital content access control using nonfungible tokens.
Figure 10:
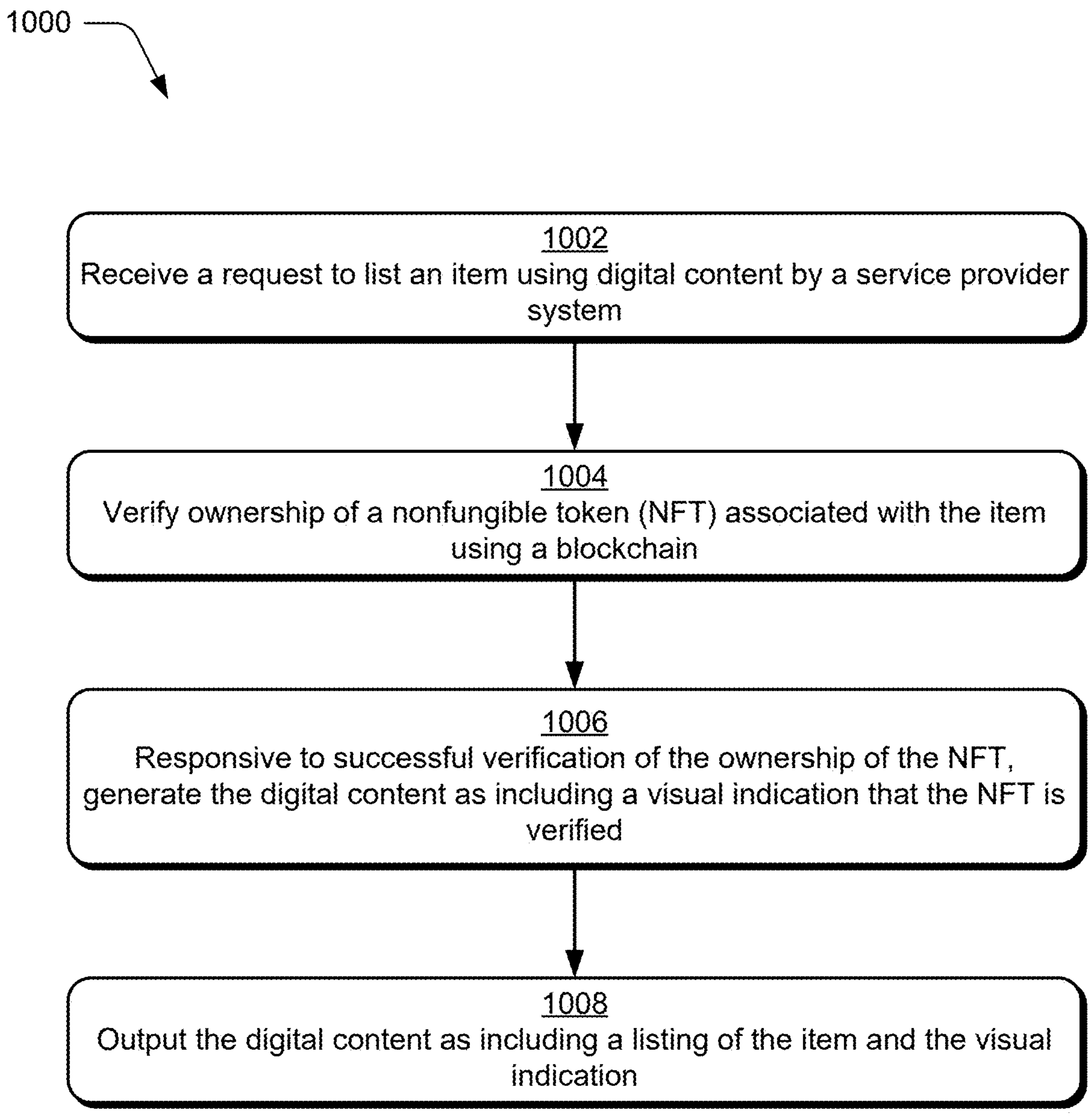
FIG. 10 is a flow diagram depicting a procedure in an example implementation of generation and output of a visual indication responsive to successful verification of a nonfungible token that describes characteristics of an item listed using digital content.

FIG. 2 depicts a system 200 in an example implementation showing operation of the service platform 156 of the service provider system 104 of FIG. 1 in greater detail as implementing a transaction between client devices. FIG. 3 depicts a system 300 in an example implementation of initiating minting of an NFT by the service provider system responsive to the transaction of FIG. 2. FIG. 4 depicts a system 400 in an example implementation showing generation of NFT data used to mint the NFT of FIG. 3. FIG. 5 depicts a system 500 in an example implementation of initiating minting of an application by the service provider system responsive to the transaction of FIG. 2. FIG. 6 depicts a system 600 in an example implementation showing generation of the application of FIG. 5 in greater detail. FIG. 7 depicts a system 700 in an example implementation of supplemental content generation. FIG. 8 depicts a system 800 in an example implementation in which execution of the application by a distributed state machine of a blockchain system is used to control access to supplemental digital content based on possession of the NFT. FIG. 9 depicts a procedure 900 in an example implementation of supplemental digital content access control using nonfungible tokens. FIG. 10 depicts a procedure 1000 in an example implantation of generation and output of a visual indication responsive to successful verification of an NFT that describes characteristics of an item listed using digital content.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-10.

To begin in the illustrated example of FIG. 2, a service provider system 104 includes a service platform 156 having a service manager module 202. The service platform 156 is configured to support transactions between client devices 106, 108, e.g., by implementing digital services 158 that are executable to transfer ownership and/or possession of an item 204 from client device 106 to client device 108. The digital services 158 are accessible via the network 110 using respective client service modules 162, 164 (e.g., browsers, network-enabled applications, plug-in modules, and so forth) executable by respective client devices 106, 108.

Examples of digital services 158 implemented by the service platform 156 in support of transactions are represented as a listing module 206, transaction module 208, and an account manager module 210. The listing module 206 is configured to generate a digital content listing 212 indicating an item 204 is available for purchase/transfer via the service platform 156. The listing module 206, for instance, exposes functionality that is accessible via the network 110 by the client device 106 to generate a digital content listing 212 indicating availability of the item 204. The digital content listing 212 is then exposed for access via the network 110 to potential purchasers, e.g., to client device 108 as a webpage, display in a dedicated application, and so forth.

The client device 106, through the client service module 162, transmits a request, which is received by the listing module to list the item 204 using digital content (block 902). The request specifies information describing the item 204, e.g., a textual description 214 and digital image 216, for inclusion as part of the digital content listing 212. The client device 106 also identifies a provider of the item 204, e.g., as a seller 218. The digital content listing 212, once generated, also includes an option 220 that is user selectable via a user interface to initiate the transaction, e.g., to "buy" or otherwise transfer possession and/or ownership of the item 204. The item is then listed using the digital content (block 904).

The digital content listing 212 is configurable to include a variety of other information, such as to include a badge 222 indicating that ownership of an NFT 224 corresponding to the item 204 has been verified. The service provider system 104, for instance, employs a blockchain interaction module 226 to access functionality made available via the blockchain 116 implemented by the blockchain system 102. An example of this is a blockchain query module 228 that is configured to verify ownership of the NFT 224 associated with the item 204 by querying the distributed ledger 128 maintained as part of the blockchain 116, e.g., that the NFT 224 "twin" of the item 204 is associated with a particular blockchain account 130.

In the example of FIG. 2, the NFT 224 is illustrated as included as part of a transfer of ownership/possession of the item 204. However, in at least some instances the NFT 224 is not communicated to the client device 108 but rather is minted as part of the blockchain 116 and accessible to the client device 108 using a respective crypto wallet 146 as described below. The blockchain interaction module 226 also includes functionality represented by an NFT interaction manager module 230 to manage additional NFT interactions, including functions to initiate minting and transfer of the NFT 224 between blockchain accounts 130.

The account manager module 210 is representative of functionality to manage a plurality of service provider accounts 232 and information associated with the accounts. The service provider accounts 232 are associated with respective users to support transactions and interact with functionality made available via the service platform 156. This includes service accounts IDs 234 that uniquely identify the service provider accounts 232 and transaction history data 236 identifying transactions performed using respective accounts, e.g., from a service provider account associated with client device 106 to a service provider account associated with client device 108. The transaction history data 236, therefore, is configured to include a variety of information, examples of which include blockchain account ID 238 used for cryptographic transactions, e.g., to receive an NFT 224 as part of the transaction, NFT data 240 describing the item 204 and/or transaction that is to be used to mint the NFT 224, and so forth.

The service manager module 202, for instance, generates the digital content listing 212 responsive to inputs received from client device 106 via the network 110. Another client device 108, after viewing this digital content listing 212 via the network 110, initiates a transaction to obtain the item 204, e.g., through selection of the option 220. The transaction transfers ownership of the item 204 (e.g., responsive to verification of a transfer of funds which may include cryptographic coins or other conventional monetary currencies), which is recorded as part of transaction history data 236. The transaction history data 236 thus memorializes the transaction and is usable as a basis to generate an NFT 224 for use in control of supplemental digital content 168 in the following discussion. Thus, this data generated by the transaction module 208 responsive to completion of the transaction of the item 204 (block 906) is received and stored by the account manager module 210 (block 908) as part of the service provider account 232.

Upon completion of the transaction, the blockchain interaction module 226 of the service provider system 104 is configured to initiate minting of the NFT 224 (block 910) by the blockchain system 102. The account manager module 210, for instance, identifies the service provider account 232 associated with the client device 108 (and more particularly a user interacting with that device) that is to obtain ownership of the item in the previous example. From this, the account manager module 210 also identifies a blockchain account ID 238 and associated blockchain system 102 that is to receive the NFT 224. In an implementation, an option is output by the blockchain interaction module 226 that is user selectable to specify the blockchain system 102 from a plurality of blockchain systems and associated blockchain accounts 130. This includes specification of a particular blockchain system and/or may include specification of a particular one of a plurality of NFT systems that are built "on top" of respective blockchain systems.

The NFT interaction manager module 230 passes transaction data 236 to a minting initiation module 302 that is configured to interact with the blockchain system 102 to cause the NFT 224 to be minted as part of the blockchain 116. The NFT 224 is minted to a blockchain account 130 as part of the distributed ledger 128 using a public key (e.g., the block account ID 238) associated with the account. The NFT 224 is then accessible using a private key maintained in a crypto wallet 146 of the owner of the NFT 224. As a result, the NFT data 240 is "signed" by a private key associated with the blockchain account 130. The transaction data 236 is then minted by nodes 112 of the blockchain system 102 and through this is incorporated within a block 120 of the blockchain 116. After minting, the NFT 224 is recorded in an irreversible and tamper-proof manner in the distributed ledger 128 and describes characteristics of the item and the transaction involving the item.

FIG. 4 depicts an example of generating data, describing the item, in greater detail that is used as a basis to mint the NFT 224. The item 204 is configurable in a variety of ways. In a first example, the item 204 is a physical item 402, as illustrated as an example of a wristwatch in FIG. 4. Accordingly, in such an example a physical item scanner 404 is employed to generate fingerprint data 406 that describes physical characteristics 408 of the physical item 402. The physical item scanner 404 is configurable in a variety of ways, examples of which include digital image scanners, depth sensors, infrared and ultrasonic scanners, x-ray scanners, and any other type of scanner usable to determine physical relationships of parts of the physical item 402 to each other, e.g., as a two dimensional or three-dimensional map.

In an implementation, the fingerprint data 406 is configured to uniquely identify the physical item 402, even for physical items having a same make and model. This is performed, for instance, by having a resolution of the physical item scanner 404 that is sufficient to identify differences in manufacture, assembly, and/or wear of parts of the physical item 402. The fingerprint data 406 is then employed by an NFT data generation module 410 to generate the NFT data 240, which may include other data describing the transaction such as amount transacted, addresses (e.g., shipped from and/or shipped to), and so forth.

In a second example in which the item 204 is digital content 412, the NFT data generation module 410 generates the NFT data 240 from the digital content 412, itself. Digital content 412, for instance, includes digital images 414, digital audio 416, digital media 418, executable 420 code, and so forth. Therefore, in this example, the NFT data 420 is generated based on this data, e.g., as a hash of the data used to represent the digital content 412, an entirety of the digital content 412, and so forth. A variety of other examples of NFT data 240 generation that are used as a basis to mint the NFT 224 are also contemplated. The NFT data 240 is then communicated by the service provider system 104 to the blockchain system 102 for minting as a tamper proof and verifiable part of the blockchain 116.

Next, an application generation module 502 is employed by the service provider system 104 to generate an application 504. The application 504 is executable as part of a distributed state machine (DST) 134 implemented by the blockchain 116 to permit access to supplemental digital content utilizing the NFT 224 (block 912). The application generation module 502, in the illustrated example, includes a user interface 506 via which user inputs are received to specify conditions that are used to define code that is executed to implement the application 504, e.g., logic operations. This includes specification of an NFT ID 508 that is used as a basis to control access, by the application 504, to supplemental digital content.

This also includes specifying a location 510, at which, the supplemental digital content is retrievable via a network 110. The location 510, for instance, is specified as a network address (URL), API of the service provider system 104, and so on. Therefore, in this example the location 510 is specified, but not the supplemental detail content 168 itself. This supports an ability of the service provider system 104 to dynamically adapt at a future point in time as to "what" is to be sent as the supplemental digital content 168. The code, for instance, when executed as part of the application 504 is configurable to "check" the location 510 for availability of supplemental digital content 168 at predefined intervals of time. If available, the application 504 is then executable to verify possession of the NFT identified by the NFT ID 508, and once verified, permit access to the supplemental digital content 168.

Once generated, the application is passed to a minting initiation module 302 to generate transaction data 512 for minting of the application 504 based on a blockchain account ID 514 to a corresponding blockchain account 516 by the blockchain system 102. Once minted, the application 504 is executed within the blockchain account 516 of the distributed state machine 134 by nodes 112 of the blockchain system 102 (block 914) and as such is executed separately and distinct from the service provider system 104 to control access to the supplemental digital content 168.

FIG. 6 depicts an example showing operation of the control module 166 in greater detail. The control module 166 in this example is configured to generate and expose supplemental digital content 168 (block 916) for access by the application 504 as executed as part of the distributed state machine 134 of the blockchain system 102. Functionality of the control module 166 is represented by a generation module 602 which is configured to generate the supplemental digital content 168, a communication module 604 which is configured to control communication of the supplemental digital content 168 to the application 504, and an execution module 606 configured to implement functionality of the supplemental digital content 168.

As shown in the example of FIG. 7, the generation module 602 includes a recipient determination module 702 that is configured to output a user interface, via which, user inputs are received to specify an intended recipient of the supplemental digital content 168. Functionality to assist in doing so includes a service provider account query module 704 and a blockchain account query module 706 that are configured to leverage information made available via service provider accounts 232 and blockchain accounts 130, respectively.

In one example, the service provider account query module 704 is configured to query service provider accounts 232 and more particularly transaction history data 236 associated with those accounts. This is performed to locate information usable to determine "who" is to receive the supplemental digital content 168, e.g., which accounts involve transactions involving particular items 204 and/or NFTs 224. For example, this is usable to determine which items 204 and/or NFTs 224 have been a subject of a transaction using corresponding accounts and based on this configure the supplemental digital content 168 for corresponding NFTs based on these items.

This may also be performed to determine "how" the supplemental digital content is to be communicated. In one example, a determination is made that a transaction involving a particular NFT is associated with the service provider account 232. A network address associated with the service provider account 232 is then used to send the supplemental digital content 168 using the communication module 604. Access to functionality of the supplemental digital content 168 is controlled through verification of possession of the NFT 224 by the application 504, e.g., to "unlock" the offer.

The blockchain account query module 706 is configured to leverage information made available via blockchain accounts 130. Continuing with the example above, the blockchain account query module 706 queries the blockchain 116 to determine whether the corresponding NFT 224 is still possessed/owned by a blockchain account 130 referenced by the service provider accounts 232. If not, the supplemental digital content 168 is not communicated, thereby conserving computational resources of both the service provider system 104 and the client device 108. If so, generation and communication of the supplemental digital content 168 continues.

A content generation module 708 is configured to generate the content included as part of the supplemental digital content 168 and include an NFT ID 710 references the NFT 224 that is a subject of the supplemental digital content 168. Content includes text, images, unique codes, and executable functionality that is to be included for display to a recipient of the supplemental digital content 168 and to make associated functionality available, e.g., access to an offer for a discount. Content is configurable in a variety of ways, examples of which include owner's manuals, digital receipts, bills of sale, product keys, shipping information, digital marketing content, offers redeemable by the service provider system 104, etc. Content in some examples is configured to encourage retention of the NFT 224 such that the NFT 224 is available at a later time to verify authenticity of the item 204, e.g., by the service provider system 104. In this way, recipients of the NFT 224 are encouraged to maintain possession of the NFT 224 to avail themselves of this functionality.

The application 504, once deployed and minted to the distributed state machine 134 of the blockchain system 102 is then configured to control access to the supplemental digital content 168 responsive to verification of the NFT 224. In the illustrated example of FIG. 8, the application 504 is configured to query a specified location 510 at the service provider system 104 for supplemental digital content 168. This may be performed at predefined intervals, responsive to a condition being met as defined by the application 504, and so forth. The execution module 606 of the service provider system 104, for instance, may provide an input to the application 504 that the supplemental digital content 168 is available. This causes the application 504 in these examples to fetch the supplemental digital content 168 for dissemination to the client device 108, e.g., as specified by the service provider system 104 as part of the supplemental digital content 168 (e.g., through a network address obtained from the service provider account 232) and/or specified upon coding of the application 504 itself.

Access to the supplemental digital content 168 is provided responsive to verified ownership of the NFT 224 (block 918). In a first example, this is performed through execution of the application 504 as part of the distributed state machine 134 to verify ownership of the NFT 224. For example, inputs received from the client device 108 are usable to verify ownership of the NFT 224 in a blockchain account 130 using a private key maintained in a crypto wallet 146 of the client device 108. Access is then permitted by the application 504 to the supplemental digital content 168. In another example, verification of possession of the NFT 224 is performed at the execution module 606 of the service provider system 104, e.g., as part of communication with the client device 108 as described above to verify that the NFT 224 is maintained in a blockchain account 130 associated with the client device 108 using the crypto wallet 146. In this way, an owner/possessor of the NFT 224 is encouraged to maintain possession, which may be used to support a variety of functionality, an example of which is described as follows.

FIG. 10 depicts a procedure 1000 in an example implementation in which verification of an NFT describing characteristics of an item is used to control output of a visual indication as a badge in digital content that lists the item. To begin in this example, a listing module 206 of the service manager module 202 receives data from client device 108 as a request to list an item 204 using digital content by the service provider system (block 1002). As previously described, this request may include a textual description 214, digital image 216, identify a seller 218, service provider account 232, and so forth.

In response, the listing module 206 employs the blockchain interaction module 226 to verify ownership of a nonfungible token (NFT) 224 associated with the item 204 using a blockchain 116 (block 1004). This is performable in a variety of ways, such as through use of a blockchain query module 228 to verify the NFT 224 is maintained in a blockchain account 130 associated with the client device 108.

Responsive to successful verification of the ownership of the NFT 224, digital content is generated that includes a visual indication that the NFT 224 is verified (block 1006). Continuing with the "twinning" example above, the NFT 224 is configured as describing characteristics of the item 204, such as physical characteristics 408 of the physical item 402. Therefore, the visual indication in this example indicates that the NFT 224 is available and is thus also available as part of the transaction as well as to verify the item 204. An example of a visual indication is displayed as a badge 222 in the digital content listing 212 of FIG. 2.

Other examples are also contemplated, including use of a visual indication indicative that the item 204 is then also verified as corresponding to the NFT 224 based on the physical characteristics detected from the item 204, e.g., by a subsequent "rescan" by the service provider system using a physical item scanner 404. The digital content is then output as including a listing of the item and the visual indication (block 1008), e.g., for access by a subsequent client device for purchase. As a result, the techniques described herein control dissemination of supplemental digital content 168 in a manner that encourages retention of the NFT 224, which is usable to support a variety of additional functionality including verification of the item 204 described by the NFT 224.

Example System and Device

Figure 11:
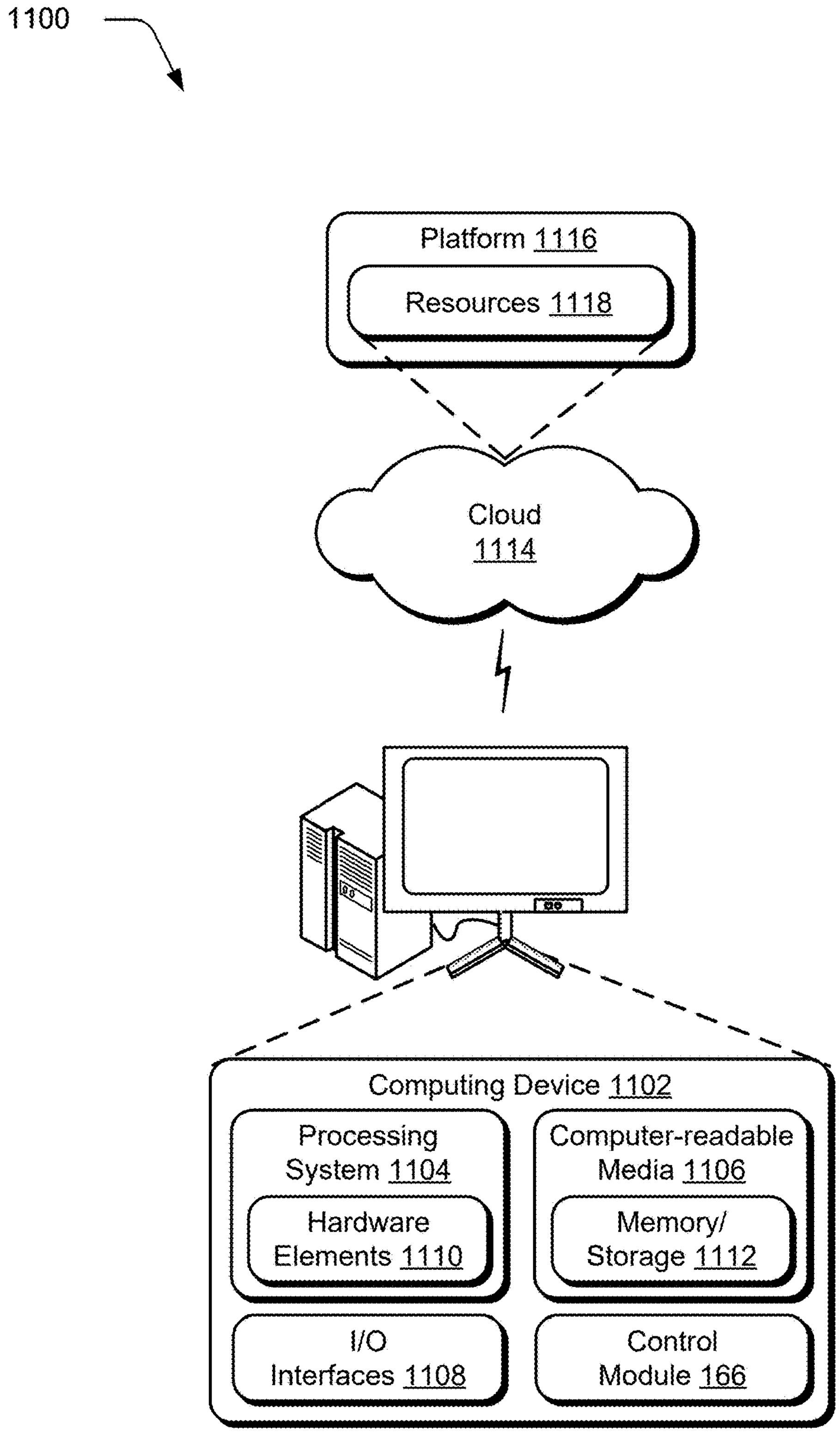
FIG. 11 illustrates an example system including various components of an example device that can be implemented as any type of computing device as described and/or utilize with reference to FIGS. 1-11 to implement embodiments of the techniques described herein.

FIG. 11 illustrates an example system generally at 1100 that includes an example computing device 1102 that is representative of one or more computing systems and/or devices that implement the various techniques described herein. This is illustrated through inclusion of the control module 166. The computing device 1102 is configurable, for example, as a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that is configurable as processors, functional blocks, and so forth. This includes implementation in hardware as an application specific integrated circuit or other logic device formed using one or more semiconductors. The hardware elements 1110 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1106 is illustrated as including memory/storage 1112. The memory/storage 1112 represents memory/storage capacity associated with one or more computer-readable media. The memory/storage 1112 includes volatile media (such as random access memory (RAM)) and/or nonvolatile media (such as read only memory (ROM), Flash memory, optical disks, magnetic disks, and so forth). The memory/storage 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1102. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1110. The computing device 1102 is configured to implement particular instructions and/or functions corresponding to the software and/or hardware modules. Accordingly, implementation of a module that is executable by the computing device 1102 as software is achieved at least partially in hardware, e.g., through use of computer-readable storage media and/or hardware elements 1110 of the processing system 1104. The instructions and/or functions are executable/operable by one or more articles of manufacture (for example, one or more computing devices 1102 and/or processing systems 1104) to implement techniques, modules, and examples described herein.

The techniques described herein are supported by various configurations of the computing device 1102 and are not limited to the specific examples of the techniques described herein. This functionality is also implementable all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 abstracts resources and functions to connect the computing device 1102 with other computing devices. The platform 1116 also serves to abstract scaling of resources to provide a corresponding level of scale to encountered demand for the resources 1118 that are implemented via the platform 1116. Accordingly, in an interconnected device embodiment, implementation of functionality described herein is distributable throughout the system 1100. For example, the functionality is implementable in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method, comprising:

verifying, by a computing device, that a nonfungible token (NFT) describing characteristics of a physical item is owned in a blockchain account referenced by a service provider account, the service provider account associated with a listing of the physical item exposed via a service platform;

scanning, by the computing device using a physical item scanner, the physical item;

verifying, by the computing device, that the physical item corresponds to the NFT;

generating, by the computing device, a visual indication that the physical item corresponds to the NFT; and outputting, by the computing device, the visual indication that the physical item corresponds to the NFT and indicating verified ownership of the NFT to the listing.

2. The method as described in claim 1, further comprising:

generating, by the computing device, supplemental digital content based on the NFT; and controlling, by the computing device, access to the supplemental digital content based on the verifying.

3. The method as described in claim 2, wherein the supplemental digital content includes an offer involving the physical item that is redeemable by the service platform.

4. The method as described in claim 1, further comprising detecting, by the computing device, the characteristics of the physical item and verifying, by the computing device, that the physical item corresponds to the NFT based on the characteristics.

5. The method as described in claim 1, wherein generating the visual indication is performed responsive to verifying that the physical item corresponds to the NFT.

6. The method as described in claim 1, further comprising initiating, by the computing device, minting of the NFT as a twin of the physical item based on the characteristics of the physical item.

7. The method as described in claim 1, further comprising determining, by the computing device, the characteristics based on scanning the physical item using the physical scanner.

8. The method as described in claim 7, wherein the characteristics include physical relationships of parts of the physical item to each other.

9. The method as described in claim 1, further comprising:

detecting, by the computing device, the characteristics of the physical item based on scanning the physical item using the physical scanner;

initiating, by the computing device, minting of the NFT as a twin of the physical item based on the characteristics; and verifying, by the computing device, that the physical item corresponds to the NFT based on a rescan of the physical item using the physical scanner.

10. A system, comprising:

a physical item scanner;

a processing system; and a non-transitory computer-readable storage medium storing executable instructions that, when executed by the processing system, cause the processing system to perform operations including:

verifying that a nonfungible token (NFT) minted as a twin of a physical item is owned in a blockchain account referenced by a service provider account, the service provider account associated with a listing of the physical item;

scanning, using the physical item scanner, the physical item;

verifying that the physical item corresponds to the NFT;

generating a visual indication that the physical item corresponds to the NFT; and outputting the visual indication that the physical item corresponds to the NFT and indicating verified ownership of the NFT to the listing.

11. The system as described in claim 10, the operations further comprising:

generating supplemental digital content based on the NFT, the supplemental digital content including an offer involving the physical item that is redeemable by a service platform managing the service provider account; and controlling access to the offer based on the verifying.

12. The system as described in claim 10, the operations further comprising determining characteristics based on scanning the physical item using a physical scanner, the characteristics including physical relationships of parts of the physical item to each other.

13. A non-transitory computer-readable storage medium storing executable instructions that, when executed by one or more processors, cause the one or more processors to perform operations including:

verifying that a nonfungible token (NFT) describing characteristics of a physical item is owned in a blockchain account referenced by a service provider account, the service provider account associated with a listing of the physical item exposed via a service platform;

scanning, using the physical item scanner, the physical item;

verifying that the physical item corresponds to the NFT;

generating a visual indication that the physical item corresponds to the NFT; and outputting the visual indication that the physical item corresponds to the NFT and indicating verified ownership of the NFT to the listing.

14. The non-transitory computer-readable storage medium as described m claim 13, the operations further comprising:

generating supplemental digital content based on the NFT; and controlling access to the supplemental digital content based on the verifying.

15. The method as described in claim 1, wherein the characteristics of the physical item include a fingerprint of the physical item generated by the physical item scanner.

16. The method as described in claim 1, further comprising generating, by the computing device, an application configured to control access to supplemental digital content based on possession of the NFT, and initiating, by the computing device, minting of the application for execution as part of a distributed state machine implemented by the blockchain.

17. The system as described in claim 10, wherein the physical item scanner includes at least one of a digital image scanner, a depth sensor, an infrared scanner, an ultrasonic scanner, or an x-ray scanner.

18. The system as described in claim 10, the operations further comprising querying the blockchain to determine whether the NFT is possessed by the blockchain account prior to generating the visual indication.

19. The non-transitory computer-readable storage medium as described in claim 13, wherein the characteristics of the physical item uniquely identify the physical item based on differences in manufacture, assembly, or wear of parts of the physical item.

20. The non-transitory computer-readable storage medium as described in claim 13, the operations further comprising receiving a request to list the physical item using digital content, the request specifying information describing the physical item including at least one of a textual description or a digital image.

* * * * *